United States Patent Office 3,464,951
Patented Sept. 2, 1969

3,464,951
ROOM TEMPERATURE VULCANIZING SILICONE RUBBER STOCK
Paul Hittmair, Siegfried Nitzsche, Manfred Wick, and Ernst Wohlfarth, Burghausen, Upper Bavaria, Germany, assignors to Wacker-Chemie G.m.b.H., Munich, Germany
No Drawing. Filed Feb. 13, 1967, Ser. No. 615,350
Claims priority, application Germany, Feb. 11, 1966, W 40,924
Int. Cl. C08g 31/14, 31/10, 31/40
U.S. Cl. 260—37                   10 Claims

ABSTRACT OF THE DISCLOSURE

A new composition of matter based on dimethylsiloxane polymers having reactive endblocks and capable of vulcanizing and curing at temperatures below 100° C. wherein the cross-linking agent is the amino substituted silicon reaction product of a halosilane and a monocycloalkyl- amine, for example, the amino substituted silicon reaction product obtained by reacting at a temperature of from —10° C. to 10° C. and normal pressure a silane of the general formula RSiX₃ wherein each R is a monovalent radical selected from the group consisting of hydrocarbon radicals, hydrocarbonoxy radicals, halogenohydrocarbon radicals and cyanoalkyl radicals and X is a halogen atom with a monocycloalkylamine.

BACKGROUND OF THE INVENTION

Room temperature vulcanizing silicone rubber (RTV) stocks have become well-known articles of commerce over recent years. Such materials are widely employed as sealants and caulking materials in the building trades as well as in the aircraft and automotive manufacturing industries and new uses for such materials are being found. The widespread use of these RTV stocks has brought about a demand for a variety of properties, hence a substantial amount of research and development has occurred to produce RTV stocks having specific and desired properties and characteristics.

In general, the room temperature vulcanizing silicone rubber stocks available today can be categorized as (1) two-component or two pack stocks, and (2) one-component or single package stocks. The two pack stock is mixed just prior to use and must be used relatively soon after mixing because the vulcanizing and curing mechanism is built into the mixture and does not require the influence or addition of any other material. Thus, when one admixes a hydroxyl endblocked dimethylsiloxane polymer, an alkyl silicate and a metal salt such as dibutyl tin dilaurate, the mass begins to vulcanize and cure at once even in confined spaces or in a tube or other package. On the other hand, a one pack system requires the presence of a reaction initiator such as water or oxygen to start the curing reaction and the ingredients can be packaged in a single package which can be opened at the time of use. Thus a mixture of a hydroxyl endblocked dimethylsiloxane polymer and ethyltriacetoxysilane can be packaged and upon exposure to atmospheric moisture the mixture will produce a rubber.

The one-component RTV silicone rubber stocks heretofore known have included mixtures of diorganosiloxane polymers having reactive end groups or endblockers such as hydroxyl and alkoxyl groups and amino substituted organosilicon compounds. These stocks are known as "amino-one-component stocks or systems." The amino substituted silicon compounds previously employed in the amino-one-component systems have been derivatives of aliphatic amines and have yielded materials which will rapidly form a skin on the surface of the material on exposure to atmospheric moisture. The formation of the skin on the surface of the otherwise uncured RTV stock impedes the cure of the material under the skin and makes it difficult to further process the material as is frequently required. Thus the troweling and smoothing of the surface and forming the surface into desired contours must be accomplished very rapidly if the skin-over time is short. Of course, the slow cure of the stock in deep-section may also be a serious drawback in many uses (e.g., in manufacture of automobiles on an assembly line). Finally, the amino substituted silicon compounds heretofore employed in amino-one-component systems were unsatisfactory for use on alkaline substrates such as lime-plaster and fresh concrete. The contact with the alkaline substrate induced gas development in the rubber stock, thus creating pores and voids in the cured product or in extreme cases creating foam-like rubber products.

The primary object of this invention is to introduce a novel one-component room temperature vulcanizing silicone rubber stock. A further object is a one-component RTV silicone rubber stock employing an amino substituted silicon compound as the cross-linking and curing ingredient, but characterized by relatively slow skin-over times, satisfactory cure times, reduction of gas formation on alkaline substrates, and reduction of toxicity from liberated amines and reduction of objectionable odor from the same source. A further object is a relatively inexpensive cross-linking system for a RTV silicone rubber stock. Other objects and advantages of this invention will be apparent from this disclosure or will be specifically set forth herein.

SUMMARY OF INVENTION

The present invention is directed to a novel room temperature vulcanizing one-component silicone rubber stock which cures on exposure to moisture, containing (1) at least one essentially linear diorganopolysiloxane having reactive end groups and (2) an amino substituted organosilicon compound prepared by reacting a halogensilane of the general formula RSiX₃ wherein each R is a monovalent hydrocarbon or substituted hydrocarbon radical or a monovalent hydrocarbonoxy radical and X is a halogen with a monocycloalkylamine.

DETAILED DESCRIPTION OF INVENTION

The linear diorganopolysiloxane employed herein as the base polymer is not novel and can be any of those diorganopolysiloxanes having reactive end groups heretofore employed in RTV silicone rubber stocks. Most commonly employed as the base polymer are the alpha, omega-dihydroxy - diorganosiloxane polymers represented by the general formula

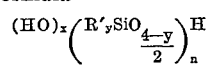

wherein each R' is a monovalent radical selected from hydrocarbon and substituted hydrocarbon radicals, $x$ has an average value of 0.99 to 1.01, $y$ has an average value of 1.99 to 2.01, $x+y=3.0$, $n$ is an integer of at least 3 and preferably at least 50. The hydroxyl groups on the terminal silicon atoms can be replaced in part or entirely by other reactive substituents such as hydrogen atoms, alkoxy radicals, aryloxy radicals, radicals of the formula R″NH— where R″ is a cycloalkyl radical of 5 to 12 carbon atoms as well as acetoxy radicals and oxime radicals. Of course, the hydrogen endblocked linear siloxane polymers will produce gassing in the presence of alkaline substrates hence should not be used for compositions employed on such substrates unless foaming or pore formation in the cured rubber are desired. The operable siloxanes are known and have been fully described in the U.S. Patent No. 3,294,732, issued Dec. 27, 1966; U.S. Patent No. 3,127,363, issued Mar. 31, 1964; U.S. Patent No. 3,105,061, issued September, 1963, and others.

The operable siloxane polymers are essentially linear hence are predominately (i.e., at least 90 mol percent) $R'_2SiO$ units. However, limited proportions, preferably below 5 mol percent and most preferably below 2 mol percent, of $R'SiO_{3/2}$ units, $R'_3SiO_{1/2}$ units and/or $SiO_{4/2}$ units can be present. The closer the polymer approaches the R'Si ratio of 2.0/1 the better the ultimate product with the exception that a softer cured rubber essentially free of extractable, uncured polymeric material can be obtained by admixing difunctional siloxane polymers having a functional group on each of the terminal silicon atoms with monofunctional siloxane polymers having a functional group on one of the terminal silicon atoms and the other terminal group being an $R'_3SiO_{1/2}$ unit.

In the formulae above, each R' can be a monovalent hydrocarbon radical of up to 36 carbon atoms. Best results are achieved with hydrocarbon substituents of 1 to 18 carbon atoms. Examples of the radicals represented by R' include alkyl radicals such as methyl, ethyl, n-propyl, isopropyl, dodecyl, octodecyl and myricyl $(-C_aH_{2a+1},$ where $a$ is 1–36$)$;

alkenyl radicals such as vinyl, allyl, hexenyl and octadecenyl cycloalkyl radicals such as cyclobutyl, cyclopentyl, cyclohexyl and cyclooctadecyl; cycloalkenyl radicals such as cyclobutenyl, cyclopentenyl, cyclohexenyl and cyclooctadecenyl; aryl radicals such as phenyl, xenyl, naphthyl and phenanthryl, aralkyl radicals such as benzyl, β-phenylethyl and xylyl, and alkaryl radicals such as tolyl and ethylphenyl.

The substituted hydrocarbon radicals represented by R' include halogenohydrocarbon radicals such as o-, m- and p-chlorophenyl, and bromophenyl radicals, α,α,α-trifluorotolyl, 3,3,3-trifluoropropyl, $C_bF_{2b+1}CH_2CH_2-$, $(C_bF_{2b+1})_2CH(CH_2)_c-$ and $(C_bF_{2b+1})_3C(CH_2)_c-$ where $b$ is 1 to 12 and $c$ is 1, 2 or 3, chloro-, fluoro- and bromo-derivatives of the various hydrocarbon radicals set forth in the preceding paragraph as well as cyanoalkyl radicals such as β-cyanoethyl, cyanopropyl, cyano-n-butyl, cyano-n-propyl and omega-cyanooctadecyl. The cyanoalkyl radicals should be present on at least 1 mol percent of the silicon atoms present if any noticeable benefit is to be achieved from their presence.

The best results are achieved when the organic substituents represented by R' have less than 19 carbon atoms and particularly with those substitutents having less than 9 carbon atoms. Most preferred are the methyl radicals, and next preferred are the phenyl, vinyl, ethyl, propyl and 3,3,3-trifluoropropyl radicals. At least 50 mol percent of the R' radicals should be aliphatic hydrocarbon radicals of not more than 4 carbon atoms. Of course, as is usually the case, the R' radicals on a single silicon atom can be alike or different and various units in the siloxane chain can be similarly or differently substituted. Homopolymers (e.g., dimethylsiloxane polymers), copolymers (e.g., dimethylsiloxanemethylvinylsiloxane-, phenylmethylsiloxane polymers) and mixtures can be employed. The siloxane polymers employed can vary from relatively mobile fluids (viscosity 50 cs. at 25° C.) to gumlike materials having viscosities in the range of $10^6$ cs. at 25° C. This can be seen from the value of $n$ in the general formula above where $n$ is at least 3 and is preferably at least 50, but can have a value as high as 2,000. The preferred siloxane polymers are those having viscosities in the range from 200 to 200,000 cs. at 25° C.

The second required ingredient herein is the reaction product of a halogenosilane and a monocycloalkylamine. The silane reactant is defined by the formula $RSiX_3$ where R can be any on the radicals described and exemplified for R' above and R can also be a hydrocarbonoxy radical as exemplified by any of the R' radicals listed above bonded to silicon through a C-O-Si linkage and as further exemplified by the preferred alkoxy radicals such as methoxy, ethoxy, n-propoxy, n-butoxy, tert-butoxy, sec-amyloxy, 2-ethylhexoxy radicals and radicals of the formula $C_aH_{2a+1}O-$ where $a$ is 1–8. The skinover time of the ultimate rubber stock can be lengthened by employing a phenylsilane reactant or other aromatic silane reactant rather than an alkylsilane reactant. This is unique to the presently disclosed systems aand cannot be observed in known amino-one-component RTV systems. The halogen atoms represented by X in the formula above can be fluorine, chlorine, bromine or iodine with chlorine most preferred because of availability. Of course, the halogen astatine could be employed if available, but this is wholly impractical.

Although this entire disclosure has been directed to the use of silanes, it is obvious to one skilled in the art that low molecular weight siloxanes containing at least three chlorine atoms per molecule bonded to silicon can be employed. Thus one could employ $X_2RSiOSiR_2X$, $X_2RSiO(XRSiO)_2SiRX_2$, and other low molecular weight polychloroorganosiloxanes, if desired.

The organohalogensilane is reacted with any monocycloalkylamine. The preferred monocycloalkylamines are those with 5 to 12 carbon atoms such as cyclopentylamine, cyclohexylamine, cycloheptylamine, 3,5,5-trimethylcyclo- and 2,3,4-triethylcyclohexylamine. Cyclohexylamine is most preferred because of availability and low cost.

The reactants can include mixtures of various silanes and various cycloalkylamines, hence the reaction is between at least one silane and at least one cycloalkylamine as described above.

The reaction of the silane and the cycloalkylamine is carried forward in accordance with known procedures for reacting halosilanes with primary amines. Such procedures are described, for example, in U.S. Patents Nos. 2,564,674, 2,579,417, and 2,579,418.

The silane and the monocycloalkylamine are employed in quantities such that there is an excess of the monocycloalkylamine over the amount required to react with all of the halogen atoms present in the silane. It is preferred to employ at least six mols of monocycloalkylamine per mol of silane. The reaction is carried out at the lowest practical temperature to reduce the side reactions producing by-products such as polymeric silazanes. Temperatures in the range of −10° C. to +10° C. have been found to be particularly advantageous for this reaction and the maximum yields of monomeric amino silanes (also called "silamines") are obtained in this reaction temperature range. The polymeric silazanes obtained as by-products in the reaction are also operable in the RTV rubber stocks but their use is less efficient and their presence is to be minimized. However, the desired silamines need not be separated from the silazanes in the practice of this invention.

The reaction of $RSiX_3$ with the monocycloalkylamine to produce the desired silamines is best carried out in the substantial absence of water and in a solvent system. The solvent employed should, of course, be inert to the reactants and solvents such as toluene and methylene chloride have proven useful. After the reaction has been completed as indicated by the cessation of precipitation of amine salts, the reaction product is separated from the amine salts by filtration or other means as desired. The solvent is removed from the reaction product preferably by distillation under reduced pressure to avoid or minimize the decomposition of the reaction product. The residue obtained is suitable for use as the amine substituted organic silicon compound for use herein.

The reaction product prepared as above and designated a silamine is retained in essentially water-free storage and is added to the siloxane polymer under essentially water-free conditions. The silamine is employed in amounts which will provide at least one gram equivalent silicon atom of the amino substituted organosilicon compound per gram equivalent of reactive end groups in the diorganopolysiloxane. Expediently, 0.2 to 15 parts by weight of amino substituted silicon compound is added to each 100 parts by weight of difunctional diorganosiloxane polymer.

The order of addition of various ingredients herein is optional but the mixture should be prepared under the exclusion of water.

In addition to the siloxane polymer and silamine, the RTV rubber stock can contain any and all of the additives normally used in RTV rubber stocks with the proviso that water should be excluded so far as is practical. Additives specifically expected are compression-set additives, pigments, soluble dyes, aromatics (essential oils), oxidation inhibitors, heat stabilizers, flame inhibitors and snuffers, light protectors, plasticizers and softeners such as trimethylsiloxy endblocked dimethylpolysiloxane fluids, reinforcing fillers and non-reinforcing fillers. When some of the R' groups are alkenyl radicals such as vinyl, the use of organic peroxides is advantageous. Condensation catalysts such as those previously disclosed in the prior art such as U.S. Patents Nos. 2,843,555, 3,127,363, and 3,082,527, among others, can be employed herein and it is suggested dibutyl tin dilaurate is particularly useful in this connection.

Examples of reinforcing fillers, i.e. fillers having surface areas exceeding 50 m.$^2$/gram, are fume silicas, silica hydrogels, silica aerogels, precipitated silicas, and certain carbon blacks. The reinforcing fillers can advantageously be treated by known methods to present organosiloxy or alkoxy groups on the surface of the filler. Non-reinforcing fillers such as calcium carbonate, diatomaceous earth, quartz flour, asbestos, glass frit and fibers, metal powders such as aluminum and nickel powder as well as metal oxide powders such as titania, alumina, ferric oxide, zinc oxide, zeolites and the like can also be employed. Mixtures of fillers are useful and the non-reinforcing fillers are preferred. Mixtures of non-reinforcing fillers with reinforcing fillers wherein the reinforcing filler is the predominant ingredient can also give excellent results. The fillers are preferably employed in amounts of 5 to 90 percent by weight calculated on the total weight of siloxane polymer and filler employed.

The compositions of this invention can be dissolved or dispersed in an inert solvent system wherein the solvent does not attack the Si-N bond. Hydrocarbon solvents such as benzene, toluene, xylene, petroleum ether, diethyl ether, dibutyl ether, methyl isobutyl ketone, and others can be employed. The solvent solution or dispersion of the composition of this invention can be packaged in an aerosol package for easy distribution through a spray valve as is common in industry and commerce.

The compositions of this invention can be stored in any desired package so long as water is excluded. The material cures under influence of moisture at room temperature. The cure proceeds at temperatures of 10° C. or lower, but the rate of cure is accelerated at higher temperatures. The water required for curing can be found in atmospheric moisture or can be added as by flooding the surface of the rubber stock with water or by adding water to the atmosphere surrounding the rubber stock, or by adding thereto materials carrying water or producing water in situ.

The RTV rubber stock will cure and adhere firmly to a substrate such as glass, porcelain, paper, wood, concrete, organic synthetic fabrics, plaster, metals, organic plastics, silicone plastics, and a wide variety of similar materials. The materials of this invention are useful as adhesives, particularly for adhering organopolysiloxane elastomers obtained by other means to other materials, for sealing joints as in buildings, automobiles and aircraft, as dental closures, as pouring materials and as coating lacquers. These materials are also useful in all those areas RTV silicone rubber is known to be useful such as protective coatings, electrical and thermal insulation, molding applications, coating textiles and paper, as well as preparation of foils, castings and laminates.

The following examples are included herein to assist those skilled in the art in fully understanding and practicing this invention. The scope of the invention is set forth in the claims and is not limited by the examples. The viscosities were measured at 25° C. in the examples. The reactions and steps described in the examples were carried out at a temperature of about 18° C. and at atmospheric pressure unless otherwise stated.

Example 1

(a) A reaction mixture was prepared by adding in dropwise fashion 14.9 g. (0.1 mol) of methyltrichlorosilane to 59.52 g. (0.6 mol) of cyclohexylamine in 1,500 ml. of dry toluene. The reaction mass was kept at a temperature in the range from −5° C. to +10° C. and was continually stirred. After the chlorosilane addition was completed, stirring was continued and the flask and contents were permitted to warm up to room temperature. After precipitation of amine salt ceased the reaction product was filtered to remove the precipitated amine salt. The toluene was taken off by evaporation at 12 mm. Hg absolute and a hot bath temperature of 50° to 60° C. The reaction product was a fluid identified by elemental analysis as methyltris-(cyclohexylamino)silane having the formula $CH_3Si(NHC_6H_{11})_3$.

(b) 4.8 ml. of the methyltris-(cyclohexylamino)-silane was mixed with 60 g. of a hydroxyl endblocked dimethylpolysiloxane of 100,000 cs. viscosity, 30 g. trimethylsiloxy endblocked dimethylpolysiloxane of 50 cs. viscosity, 20 g. toluene and 10 g. dried diatomaceous earth. Upon exposure to atmospheric moisture (25° C., 65% relative humidity) the mixture so prepared formed a skin on the surface within 20–30 minutes.

(c) A control material was prepared identically to the procedure described in (b) except the methyltris-(cyclohexylamino)silane was replaced by an equal volume of methyltris-(ethylamino)silane. The control material had a skin-over time of 2 to 3 minutes in contrast to the 20 to 30 minutes noted in (b) under the same temperature and relative humidity conditions (i.e., 25° C., 65% relative humidity).

Example 2

(d) Following the procedure set forth in Example 1(a) supra, 0.1 mol of $C_6H_5SiCl_3$ was reacted with 0.6 mol $H_2NC_6H_{11}$. The product obtained was identified by elemental analysis as $C_6H_5Si(NHC_6H_{11})_3$.

(e) 4.0 ml. of the phenyltris-(cyclohexylamino)-silane was mixed with 40 g. of 100,000 cs. viscosity hydroxyl endblocked dimethylpolysiloxane, 10 g. of 50 cs. viscosity trimethylsiloxy endblocked dimethylpolysiloxane and 50 g. dried fume silica. The mixing was carried out in the substantial absence of moisture and the mixture so produced was stored in tubes for several months without change of consistency. The mixture was spread on a variety of substrates and a skin formed on the surface of the rubber stock within 1.5 hours of exposure at 25° C. and 65% relative humidity. In each case the cured rubber was found to adhere to the substrate. In contrast to the skin-over time noted, an identical composition, identically prepared but containing 4.0 ml. of the

of Example 1(a) in place of the $C_6H_5Si(NHC_6H_{11})_3$ was found to skin-over in 20 to 30 minutes.

(f) A control material prepared as in 2(e) supra and containing 4 ml. of $CH_3Si(NHC_4H_9)_3$ in place of the $C_6H_5Si(NHC_6H_{11})_3$ formed a skin within 1 to 2 minutes under the conditions described in (e) above.

(g) A further control for comparison was prepared exactly as in (e) above, but substituting 4 ml. of methyltris(anilino)silane for the phenyl-tris-(cyclohexylamino)-silane. This control material did not form a skin until after more than 150 hours exposure to the atmosphere at 25° C. and 65% relative humidity.

Example 3

A mixture was prepared employing 50 grams of the mixture described in (e) supra and consisting of hydroxyl endblocked dimethylpolysiloxane, silica and trimethylsiloxy endblocked dimethylpolysiloxane and 2 ml. of methyltris-(cyclohexylamino)silane (as described in (a) above). The mixture was exposed to the atmosphere at 25° C. and 65% relative humidity by forming a sheet 3 mm. thick on fresh concrete. The material was fully cured to a pore-free, solid elastomer within five hours.

A control mixture identical to the above mass but containing 2 ml. of methyltris-(ethylamino)silane in place of the methyltris-(cyclohexylamino)silane was placed on fresh concrete in a 3 mm. thick layer under the same conditions noted above. The mixture cured to a porous, foamlike product within four hours.

Example 4

Mixtures, each consisting of 60 g. of 100,000 cs. viscosity hydroxyl endblocked dimethylpolysiloxane, 10 g. of 50 cs. viscosity trimethylsiloxy endblocked dimethylpolysiloxane, and 40 g. of dried precipitated calcium carbonate were mixed with 4.5 ml. of the various amino substituted silicon compounds listed below. The time elapsed until a skin forms on the exposed mixture (25° C./65% relative humidity) was measured and is recorded below.

| Amino-substituted silicon compound | Skin-over time |
| --- | --- |
| Methyltris(n-heptylamino)silane __minutes__ | 5 |
| Phenyltris(n-heptylamino)silane ____do____ | 5 |
| Fluid as prepared in Example 1(a) ___do____ | 25 |
| Fluid as prepared in Example 2(d) __hours__ | 1.5–2 |

Example 5

(h) The procedure described in Example 2(d) was repeated employing 0.6 mol of 3,5,5-trimethylcyclohexylamine in place of the cyclohexylamine. A fluid was obtained which was identified by elemental analysis as phenyltris-(3,5,5-trimethylcyclohexylamino)silane of the formula

(i) 3.6 mol of the fluid prepared in (h) above was mixed with a mixture of 60 g. of 100,000 cs. viscosity hydroxyl endblocked dimethylpolysiloxane, 10 g. of 50 cs. viscosity trimethylsiloxy endblocked dimethylpolysiloxane and 40 g. of dried precipitated calcium carbonate. The mixture was exposed to air at 25° C., 65% relative humidity and a skin formed on the surface after 60 minutes exposure time.

(j) A control prepared for comparison and identical to (i) except employing 3.6 ml. of phenyltris-(ethylamino)silane in place of the phenyltris-(3,5,5-trimethylcyclohexylamino)silane and the control skinned over within 2 to 3 minutes under identical conditions.

Example 6

Equivalent results were achieved when Example 1(b) was repeated employing the following siloxane polymers in place of the 100,000 cs. viscosity hydroxyl endblocked dimethylpolysiloxane. A 5,000 cs. viscosity hydroxyl endblocked copolymer of 90 mol percent $(CH_3)_2SiO$ units and 10 mol percent $(CH_2=CH)CH_3SiO$ units; a 2,000 cs. viscosity hydroxyl endblocked copolymer of 90 mol percent $(CH_3)_2SiO$ units, 8.5 mol percent $CH_3(C_6H_5)SiO$ units and 1.5 mol percent $(C_6H_5)_2SiO$ units; a 150,000 cs. viscosity copolymer of 99.8 mol percent $(CH_3)_2SiO$ units, 0.19 mol percent $CH_3(C_6H_5)SiO$ units and 0.01 mol percent $CH_3(HO)SiO$ units endblocked by $$HO(CH_3)_2SiO_{1/2}$$

units; a 50,000 cs. viscosity copolymer of 80 mol percent $(CH_3)_2SiO$ units and 20 mol percent $$CF_3CH_2CH_2(CH_3)SiO$$

units having acetoxy endblockers; a hydrogen endblocked, or methoxy endblocked, or butoxy endblocked dimethylsiloxane polymer of 500 to 150,000 cs. viscosity.

Example 7

Equivalent results are achieved and are excellent when Examples 1 (a) and (b) are repeated employing ethyltrichlorosilane, methoxytrichlorosilane, methyltribromosilane, methyltriiodosilane, butyltrichlorosilane, or 3,3,3-trifluoropropyltrichlorosilane in place of the methyltrichlorosilane and cyclopentylamine, cyclohexylamine, cycloheptylamine, 3,5,5-trimethylcyclohexylamine or 2,3,4-triethylcyclohexylamine in place of the cyclohexylamine.

That which is claimed is:

1. A composition of matter admixed in the substantial absence of moisture consisting essentially of
   (1) an essentially linear diorganopolysiloxane having reactive endblocks, having a viscosity of 50 to 1,000,000 cs. at 25° C., the organic radicals bonded to silicon being selected from the group consisting of monovalent hydrocarbon radicals, monovalent halogenohydrocarbon radicals and cyanoalkyl radicals, the reactive endblocks being selected from the group consisting of hydroxyl groups, hydrogen atoms, alkoxy radicals, aryloxy radicals, radicals of the formula R''NH— wherein R'' is a cycloalkyl radical of 5 to 12 carbon atoms, acetoxy radicals and oxime radicals, and
   (2) the amino substituted silicon reaction product obtained by reacting at a temperature of from —10° C. to 10° C. and normal pressure a silane of the general formula $RSiX_3$ wherein each R is a monovalent radical selected from the group consisting of hydrocarbon radicals, hydrocarbonoxy radicals, halogenohydrocarbon radicals and cyanoalkyl radicals and X is a halogen atom with a monocycloalkylamine.

2. A composition in accordance with claim 1 wherein the organopolysiloxane (1) has the general formula

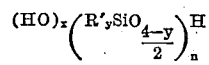

where $x$ has an average value of 0.99 to 1.01, $y$ has an average value of 1.99 to 2.01, $x+y=3$, $n$ is an integer in the range from 3 to 2,000 and each R' is a monovalent hydrocarbon or halogenohydrocarbon radicals.

3. A composition in accordance with claim 1 wherein the organopolysiloxane (1) is a hydroxyl endblocked dimethylpolysiloxane and the amino substituted silicon reaction product (2) is prepared from
   (a) methyltrichlorosilane, phenyltrichlorosilane or a mixture thereof, and
   (b) cyclohexylamine, cyclopentylamine, cycloheptylamine, 3,5,5-trimethylcyclohexylamine, 2,3,4-triethylcyclohexylamine, or mixtures thereof.

4. A composition in accordance with claim 2 wherein the amino substituted silicon reaction product (2) is prepared from $CH_3SiCl_3$, $C_6H_5SiCl_3$ or mixtures thereof and cyclohexylamine.

5. A composition in accordance with claim 1 further characterized in that a filler is present.

6. The composition of claim 5 wherein the filler is a silica.

7. The composition of claim 1 further characterized in that it contains 100 parts by weight of diorganopolysiloxane (1) and 0.2 to 15 parts by weight of amino substituted silicon reaction product (2) prepared from at least 6 mols of a monocycloalkylamine of from 5 to 12 carbon atoms and an organotrichloorsilane wherein the organic substituents are monovalent hydrocarbon radicals of 1 to 8 carbon atoms.

8. The composition of claim 7 further characterized in that the diorganopolysiloxane is a hydroxyl endblocked dimethylpolysiloxane of 50 to 1,000,000 cs. viscosity at 25° C.

9. The composition of claim 8 further characterized in that the composition contains (3) 5 to 90 percent by weight based on the weight of organopolysiloxane and filler of a filler.

10. The composition of claim 9 further characterized in that the filler is a silica filler.

References Cited

UNITED STATES PATENTS

| 3,032,528 | 5/1962 | Nitzsche et al. | 260—46.5 |
| 3,243,404 | 3/1966 | Martellock | 260—37 |

FOREIGN PATENTS

| 1,120,690 | 12/1961 | Germany. |
| 1,255,924 | 12/1967 | Germany. |

DONALD E. CZAJA, Primary Examiner

M. I. MARQUIS, Assistant Examiner

U.S. Cl. X.R.

260—46.5, 2, 448.2, 32.8, 33.2, 33.6; 117—124, 125, 148, 139.5, 155, 161, 135.1